March 25, 1969 R. L. CALDWELL 3,434,568

THREE-DIMENSIONAL DISPLAY OF BOREHOLE LOGS

Filed Sept. 30, 1966 Sheet 1 of 3

INVENTOR
RICHARD L. CALDWELL
BY
Arthur F. Zobal
ATTORNEY

INVENTOR
RICHARD L. CALDWELL
BY
Arthur F. Zobal
ATTORNEY

United States Patent Office 3,434,568
Patented Mar. 25, 1969

3,434,568
THREE-DIMENSIONAL DISPLAY
OF BOREHOLE LOGS
Richard L. Caldwell, Dallas, Tex., assignor to Mobil Oil
Corporation, a corporation of New York
Filed Sept. 30, 1966, Ser. No. 583,284
Int. Cl. G01v 1/34
U.S. Cl. 181—.5                                     2 Claims

ABSTRACT OF THE DISCLOSURE

The specification discloses the formation of a three-dimensional light transparency from borehole data obtained at a plurality of depths by scanning the borehole walls with a sensing device comprising a periodically operated acoustic transmitter and receiver. From the data obtained from the scanning operations, there is formed a two-dimensional light transparency having visible patterns representative of the characteristics of the borehole walls. One dimension represents the data obtained from each scanning operation and the other dimension is representative of the depth at which the scanning operation is carried out. The two-dimensional light transparency is folded into a three-dimensional cylinder wherein the dimension in the direction of the axis of the cylinder represents depth.

---

This invention relates to a technique for converting two-dimensional borehole logs into a three-dimensional presentation in order to facilitate the interpretation of the data obtained.

In United States patent application Ser. No. 507,630, filed Oct. 23, 1965, now U.S. Patent No. 3,369,626, by Joseph Zemanek, Jr., and assigned to the same assignee as the present invention, there is disclosed a borehole logging technique and system wherein the walls of a borehole are scanned in three dimensions with acoustic energy and the data obtained recorded and presented as a two-dimensional flat display geographically oriented. In the scanning operation, an acoustic transducer arrangement comprising a directional transmitter and receiver is rotated in a borehole through 360° at each of a plurality of successive depths. During each cycle of rotation, a plurality of acoustic pulses is repetitively applied to the borehole walls and reflected acoustic energy detected and transmitted uphole to an oscilloscope. In one embodiment, there is also rotated concurrently with the transducer an orientating sensing means which produces an orienting signal each time the transducer arrangement is rotated past magnetic north. These signals are employed to initiate the sweep of the electron beam of the cathode ray tube of the oscilloscope. During each rotational cycle there is produced across the face of the oscilloscope a trace representative of the borehole wall characteristics sensed through 360° by the rotating transducer arrangement. Each successive trace is photographed by suitable means for the production of a two-dimensional flat record made up of a plurality of horizontal traces displayed vertically and oriented geographically. In this manner, there is produced a display representative of a folded-out section of the inside of the borehole wall. Analysis of the two-dimensional display is carried out in order to determine characteristics of the formations, such as faults, fractures, dip, etc.

In a display of this type, however, certain signal patterns are difficult to interpret, particularly those of nearly horizontal fractures and gently dipping beds.

In accordance with the present invention, interpretation of the two-dimensional display is facilitated by producing a two-dimensional light transparency of the display having visible functions representative of the parameters sensed through the 360° cycles in the borehole. These light transparencies may be produced, for example, by placing a transparent member over the two-dimensional display and manually tracing the signal patterns on the transparent member or producing a photographic negative of the two-dimensional display to form the desired light transparency. The two-dimensional light transparency then is formed into a three-dimensional cylinder by folding the transparency in the trace directions wherein the dimension in the direction of the axis of the cylinder represents depth. The transparent cylinder thus represents the borehole with fractures, dip, etc. visible exteriorly of the cylinder in their true perspective. Geographical orientation of the cylinder allows one to determine quite clearly the direction of the fractures or dip, etc.

For further objects and adavntages of the present invention and for a more complete understanding thereof, reference may now be had to the following detailed description taken in conjunction with the accompanying drawings wherein.

Figure 1:
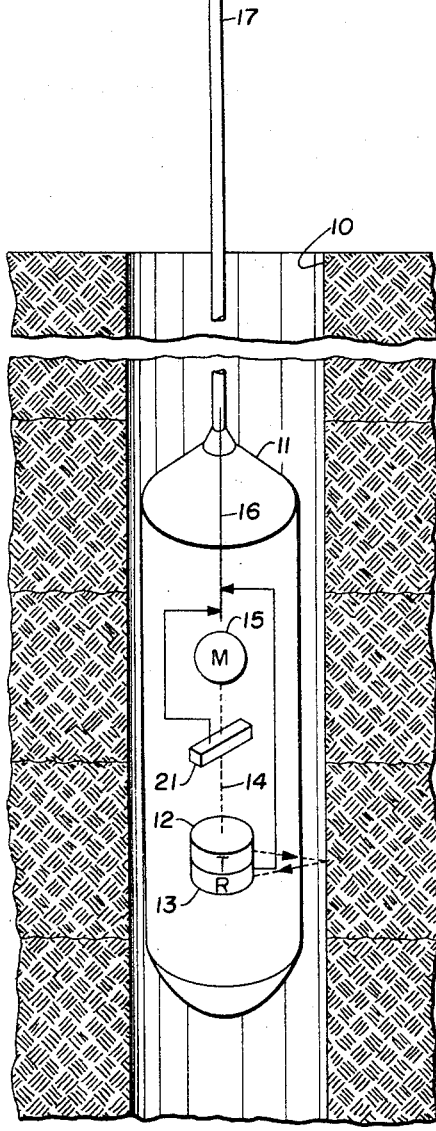
FIGURE 1 illustrates a borehole and surface system for producing the two-dimensional display employed for carrying out the present invention.

Referring now to FIGURE 1, there will be described briefly the borehole and surface system employed for obtaining a two-dimensional display of the three-dimensional measurements carried out in the borehole illustrated at 10. The borehole system comprises a borehole tool 11 having a transducer arrangement which, in the figure disclosed, comprises a separate directional acoustic transmitter 12 and a receiver 13, both of which are rotated through 360° by a shaft 14 driven by motor 15. During each 360° cycle, the transmitter 12 is repetitively pulsed a number of times for the application of acoustic pulses to the borehole wall. The reflected pulses following each transmitted pulse are detected by receiver 13, the output of which is applied to the surface by way of cable conductor 16. During logging operations, the tool 11 may be moved continuously through the borehole by supporting cable 17 wound and unwound upon drum 18 driven by motor 19 and connection 20. Thus, the transducer arrangement is employed to scan the borehole walls at each of a plurality of successive depths.

Also coupled to shaft 14 for rotation therewith is a magnetic north sensing means 21 which may comprise a Hall effect device. This sensing means produces an orienting signal each time the transducer arrangement passes magnetic north. The output of the sensing means 21 also is transmitted to the surface by way of cable conductor 16.

At the surface, the signal pulses are taken from cable conductor 16 by way of slip ring and brush arrangement illustrated, respectively, at 22 and 23, the output of which is applied to instrumentation 24 including amplifiers, filters, etc. The orienting signals are applied to trigger a saw-tooth wave sweep generator 25, the output of which is applied to the horizontal deflection plate of an oscilloscope 26. These orienting signals thus initiate the sweep of the electron beam of the cathode ray tube of the oscilloscope. The output of the receiver is applied to the cathode of the cathode ray tube of the oscilloscope whereby visible indication is produced on the face of the scope each time the receiver of the transducer arrangement receives an acoustic echo. The transducer is pulsed at a repetition rate much greater than the time required for a complete rotation of the transducer. Thus, during each rotational cycle at each depth there is produced across the face of the oscilloscope 26 a trace illustrated at 27 characterizing the borehole wall and physical changes thereof as sensed by the transducer arrangement upon rotation. Angular position around the periphery of the borehole is indicated by increasing distance to the right. Discontinuities illustrated at 28 will occur in the trace when irregularities in the face of the borehole are present, for example, when a fault in the subsurface formation crosses the borehole, whereby there is no return of the acoustic energy applied to the borehole walls. Successive traces are photographed by a camera 30 for the production of a two-dimensional print or display illustrated at 31 in FIGURE 2 and made up of a plurality of near-horizontal traces displayed vertically, as shown in more detail in FIGURE 3, and hence which represent a folded-out section of the inside of the borehole wall. Each trace on the face of the oscilloscope may be recorded on a plate of film, for example, a plate of Polaroid type film. (Polaroid is the trademark for film of the Polaroid Corporation, Cambridge, Mass.). In this embodiment, an arrangement is provided (FIGURE 7) for stepping the electron beam of the oscilloscope in a vertical direction for each horizontal sweep. Since the traces on the face of the scope are light, the traces or signal patterns on the Polaroid prints also will be light although shown dark in FIGURE 2. Since each trace is initiated with the magnetic north signal from the sensing means 21, the resulting prints or displays are oriented geographically with respect to magnetic north. Orientation of the physical changes which occur on the borehole wall may be determined by reference to the letters located at the bottom of print 31. Analysis and interpretation of these changes as reflected by the signal patterns on the prints are carried out in order to obtain information about dip direction and fracture orientation. As mentioned above, however, certain signal patterns are difficult to interpret.

Figure 2:
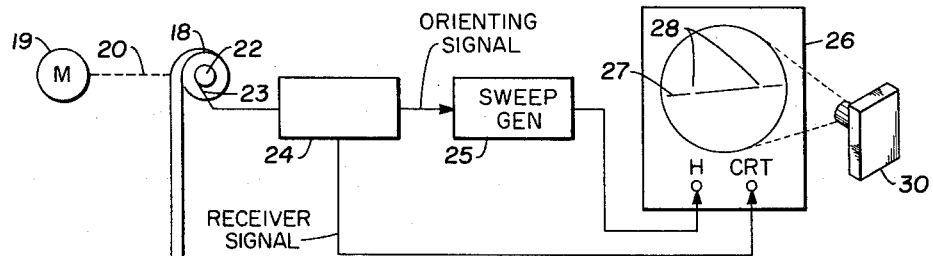
FIGURES 2 and 3 illustrate a two-dimensional display produced with the arrangement of FIGURE 1.
Figure 2:
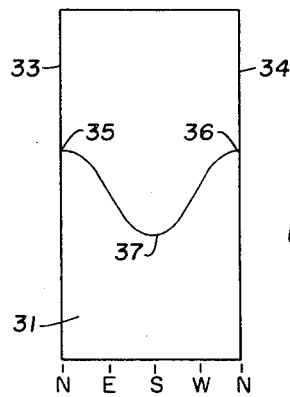
Figure 3:
Figure 4:
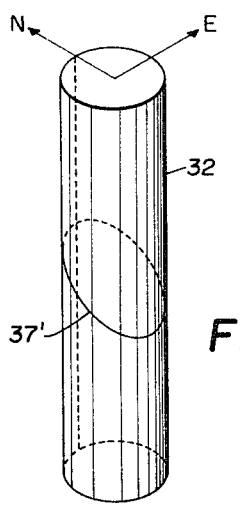
FIGURE 4 illustrates a light transparency of the display of FIGURE 2 and folded in a manner such that the axis through the cylinder represents depth.

In accordance with the present invention, interpretation may be facilitated by laying a transparent member over the two-dimensional prints and tracing the patterns onto the transparent member. This member is then folded about its ends in the trace directions to form the cylinder illustrated at 32 in FIGURE 4. Assuming that the display 31 of FIGURE 2 represents the light transparency produced, the ends 33 and 34 are folded until they meet and ends 35 and 36 of pattern 37 are aligned. The axis passing through the resulting cylinder represents depth, whereby the cylinder represents the borehole with all signal patterns and hence physical changes shown thereon exteriorly in their true perspective. Thus, it can be clearly seen that the signal pattern 37 of FIGURE 2 represented at 37' in FIGURE 4, represents a dipping formation, or fault plane cutting across the borehole, which may not be immediately recognized from the display of FIGURE 2.

In the embodiment mentioned above wherein the traces are recorded on a Polaroid print, the tool 11 is moved, during logging, a distance such that each print may represent a 15-foot section of the borehole. Tracing the signal patterns on a transparent member and then folding the member into a cylinder provides a convenient and quick technique for interpreting the data, especially in field operations. For a more detailed study, the desired transparency may be obtained from the negative of the print. The patterns on the negatives accordingly will be dark. The negatives may be enlarged, stacked end on end, and folded into a cylinder to produce a full-sized model of an enlarged section of the borehole.

Figure 5:
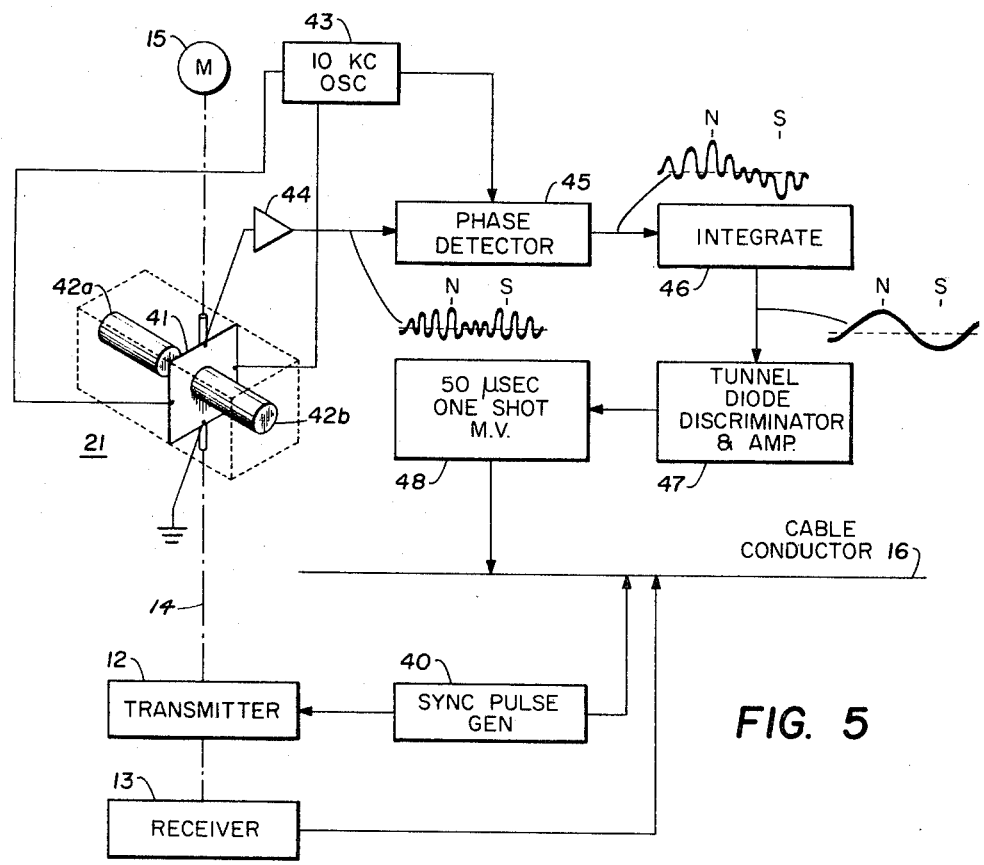
FIGURE 5 represents instrumentation employed in the borehole tool for obtaining the measurements desired.

Referring now to FIGURE 5, there will be described in more detail the downhole instrumentation employed for producing the trace 27 on the face of the oscilloscope 26. While a separate directional transmitter 12 and receiver 13 are shown, it will be appreciated that a single transducer, commonly referred to as a transceiver, could be used to perform both functions. The rate of rotation of the assembly by motor 15 may be of the order of three revolutions per second. For the purpose of scanning the borehole walls, the transmitter 12 may emit a predominant frequency of the order of 1–2 megacycles per second and may be pulsed at a repetition rate of 2,000 pulses per second. Pulsing is carried out by sync pulse generator 40. The output of this generator also is applied by suitable circuitry, not shown, to cable conductor 16 for transmission to the surface. This conductor is represented by a single line; however, it may comprise two conductors employed also for transmitting D-C power downhole for use by the borehole tool instrumentation. The polarity of the sync pulses applied to the conductor 16 preferably is positive. The output of receiver 13 also is applied to cable conductor 16 by suitable circuitry, not shown.

The hall effect device 21 comprises a semiconductor slab 41 mounted upon shaft 14 for rotation concurrently with the rotation of the transmitter-receiver assembly. Two flux concentrators, 42a and 42b, positioned on either side of the Hall effect device, concentrate the flux from the earth's magnetic field so that it passes through the Hall effect device. The Hall effect device is excited by a 10 kc. oscillator 43 for the production of a signal whose amplitude varies upon rotation of the device in accordance with the earth's magnetic field strength in the borehole. The signal from the Hall effect device is amplified by amplifier 44, the output of which is compared with the output from the oscillator 44 by phase detector 45. The output of the phase detector 45 is integrated by integrator 46 to remove the 10 kc. carrier signal and to produce a sine wave having a maximum amplitude when the Hall effect device is oriented toward the north. The output of the integrator 46 may be applied to a differentiator (not shown) to remove the effect of a D-C signal which may occur as a result of temperature variations. The resultant output then is applied to a tunnel diode discriminator and amplifier 47 which produces an orienting pulse each time the input sine wave goes through zero in a positive direction which will be when the Hall effect device is oriented in a westerly direction. In order to produce the orienting signal when the transmitter-receiver are oriented toward magnetic north, the Hall effect device and transmitter-receiver are displaced angularly 90°. That is, when the transmitter-receiver are oriented toward magnetic north, the Hall effect will be oriented toward the west.

The output of the circuit discriminator circuit 47 may be applied by way of an impedance matching circuit to circuit 48 which may be a multivibrator for the production of a negative pulse having a time duration of the order of 50 microseconds. The output of circuit 48 is applied by suitable circuitry, not shown, to cable conductor 16 for transmission to the surface.

Figure 6:
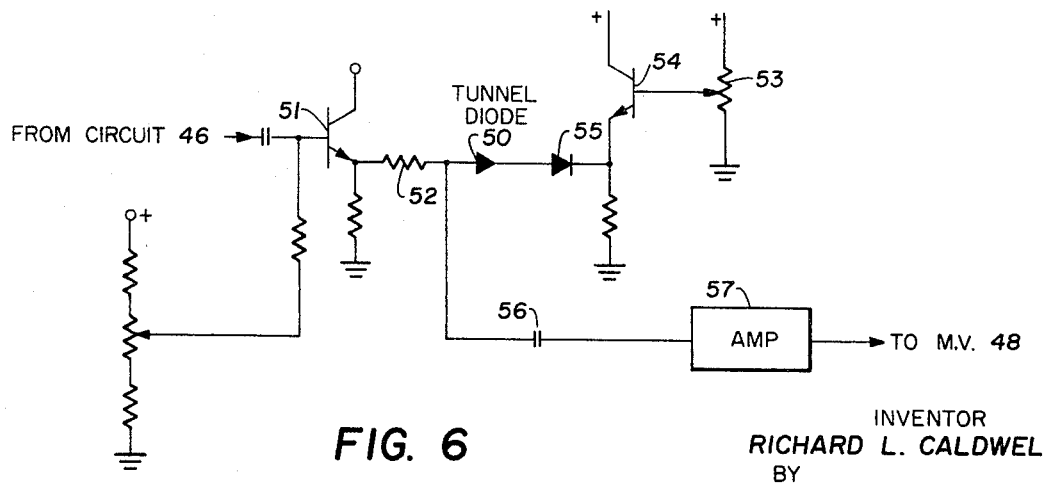
FIGURE 6 illustrates in detail the electrical circuitry of one of the components of FIGURE 5.

The circuit 47 may be of the type shown in FIGURE 6 which includes what is commonly referred to as a tunnel diode 50. As is known, tunnel diodes have a characteristic such that an increase in current through the tunnel diode produces an increase in voltage across the diode until a certain critical value of current is reached, above which increasing current causes a substantial steplike increase in voltage across the diode.

The circuitry in FIGURE 6 is such that the critical voltage is applied to tunnel diode 50 when the output of the integrator 46 passes through zero in the positive direction. This voltage is applied through an emitter follower 51 and resistor 52 to tunnel diode 50.

The voltage applied to the other side of the tunnel diode 50 is developed by means of potentiometer 53 and emitter-follower 54. This voltage is adjusted by means of potentiometer 53 so that the tunnel diode will reach the critical point at the desired level of input voltage. The voltage of the emitter of the emitter-follower 54 is applied through diode 55 to tunnel diode 50. When the input voltage from integrator 46 passes through zero in the positive direction, the tunnel diode 50 is biased to its critical point resulting in a sharp increase of voltage thereacross. The result is a positive-going pulse which is coupled through capacitor 56 to amplifier 57. The output of amplifier 57 is a negative-going pulse which triggers multivibrator 48.

Figure 7:
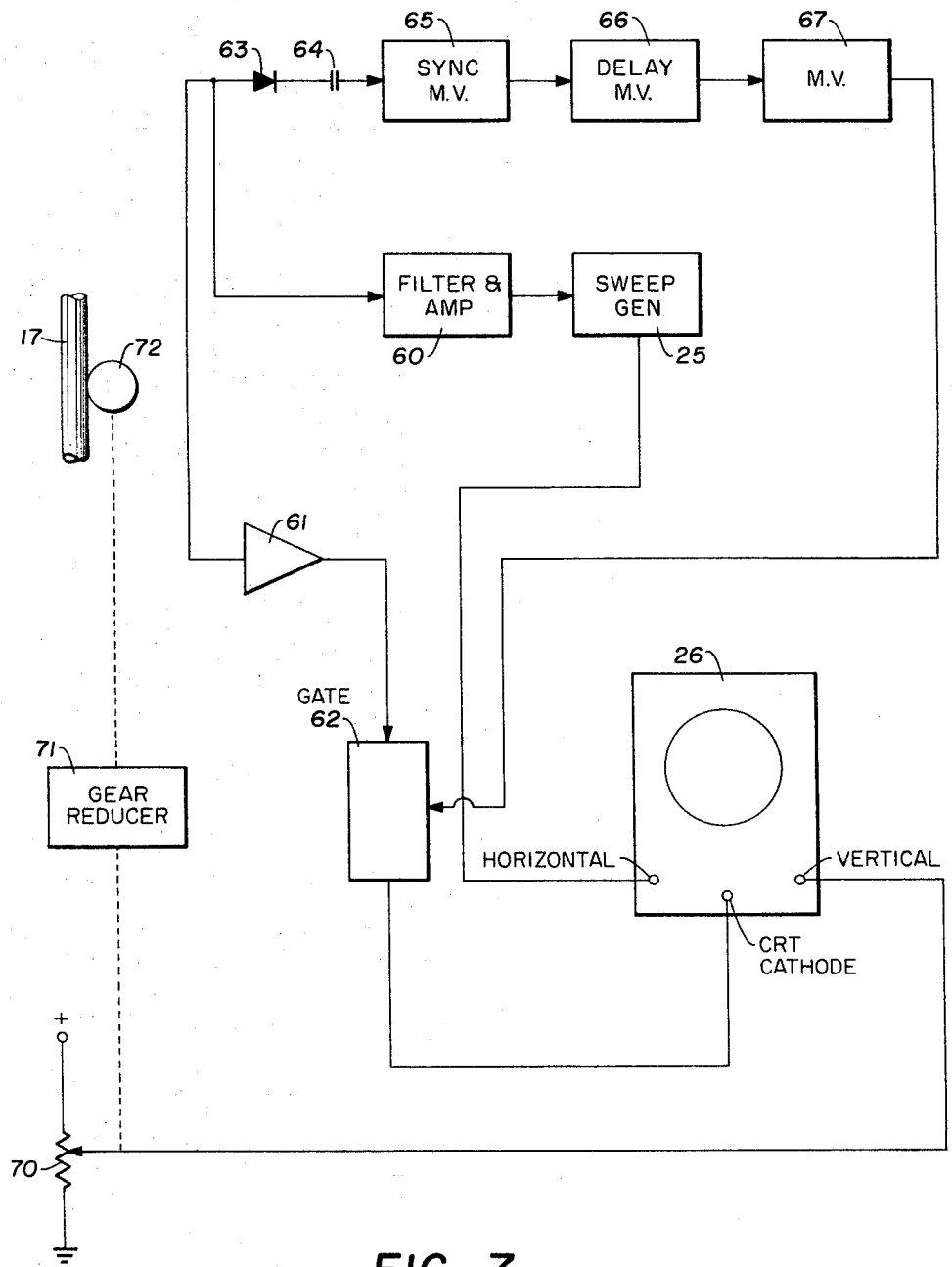
FIGURE 7 represents instrumentation employed at the surface for obtaining the desired measurement.

Referring to FIGURE 7, there will be described in more detail the uphole instrumentation. As indicated previously, the negative orienting pulses, the positive sync pulses, and the receiver pulses are transmitted to the surface by way of cable conductor 16. These are taken from the cable conductor by way of slip ring and brush 22 and 23 (FIGURE 1). Circuitry 60 is employed to select only the negative orienting signals for application to sweep generator 25. As described previously, the output of sweep generator 25 is applied to the horizontal deflection plate of cathode of oscilloscope 26. The receiver pulses are applied to the cathode of the cathode-ray tube of the oscilloscope 26 by way of amplifier 61 and gate 62. Gate 62 is provided to insure that the electron beam is turned on only by the transmitted receiver signals or pulses. Normally, this gate blocks the passage of signals to the cathode-ray tube of the oscilloscope 26 and is opened only at a time when the receiver signals are expected, to allow only these signals to pass to the oscilloscope.

The transmitted sync pulses are employed to activate circuitry to trigger or open gate 62. The sync pulses are applied to diode 63, which blocks all negative pulses, and through capacitor 64 to sync multivibrator 65. A delay multivibrator 66 is triggered coincidentally by the output from sync multivibrator 65. Multivibrator 66 in turn triggers multivibrator 67 for the production of a gating signal which occurs when the receiver signals are expected. This gating signal opens gate 62 to allow the receiver signals to pass to oscilloscope 26. The output of sync multivibrator 65 also prevents the delay multivibrator 66 from responding to any spurious signals.

Vertical deflection of the beam on the oscilloscope face is performed in correlation with the vertical movement of the logging tool in the borehole. In order to accomplish this, a potentiometer 70 is provided. The contact of this potentiometer is mechanically coupled through gear reducer 71 to reel 72 driven by the logging cable 17. In logging operations, the logging cable tool 11 normally is moved continuously through the borehole. As the logging tool moves vertically in the borehole, the contact of potentiometer 70 moves across the resistance element thereby generating a slowly changing sweep voltage which is applied to the vertical deflection plate or oscilloscope 26. The inclined traces, shown in FIGURE 3, indicate the continuous change of depth of the logging tool. Each trace will begin at a height substantially where the preceding trace terminated.

What is claimed is:

1. A method of converting data, obtained from borehole logging operations, to three-dimensional form, said data being obtained from logging operations wherein:

an acoustic transmitting and receiving means is moved through a borehole, during movement through said borehole said acoustic transmitting and receiving means is rotated cyclically 360° about the axis of said borehole and operated periodically during each cycle to carry out sensing operations by periodically transmitting acoustic pulses to the borehole wall and detecting acoustic energy reflected from said borehole wall, from reflected acoustic energy detected during each cycle there is presented data extending substantially in a first dimension on the face of an oscilloscope, said data presented on the face of said oscilloscope during successive cycles of operation being photographed for the production of a two-dimensional print representative of parameters sensed 360° around said borehole wall at different depths, said method comprising the steps of:

from said print produced, forming a two-dimensional light transparency of said print and having visible functions representative of parameters of said borehole wall sensed, one dimension being representative of the parameters sensed through each 360° cycle and the other dimension being representative of the depth at which said sensing operations were carried out, and folding said two-dimensional light transparency in the direction of said one dimension to form a three-dimensional cylinder wherein the dimension in the direction of the axis of said cylinder represents the depth at which said sensing operations were carried out.

2. The method of claim 1 wherein:

said two-dimensional light transparency is formed by tracing, onto a light transparent, two-dimensional member, the pattern of said data recorded on said print.

References Cited

UNITED STATES PATENTS

| | | | |
|---|---|---|---|
| 2,412,174 | 12/1946 | Rhoades | 250—106 X |
| 2,631,270 | 3/1953 | Goble | 340—18 X |
| 2,665,187 | 1/1954 | Kinley et al. | 346—77 X |
| 3,065,405 | 11/1962 | Jarrett | 340—18 X |
| 3,323,612 | 6/1967 | Patterson et al. | 340—18 X |

FOREIGN PATENTS 928,583   6/1963   Great Britain.

BENJAMIN A. BORCHELT, *Primary Examiner.*

J. FOX, *Assistant Examiner.*